United States Patent Office  3,714,024
Patented Jan. 30, 1973

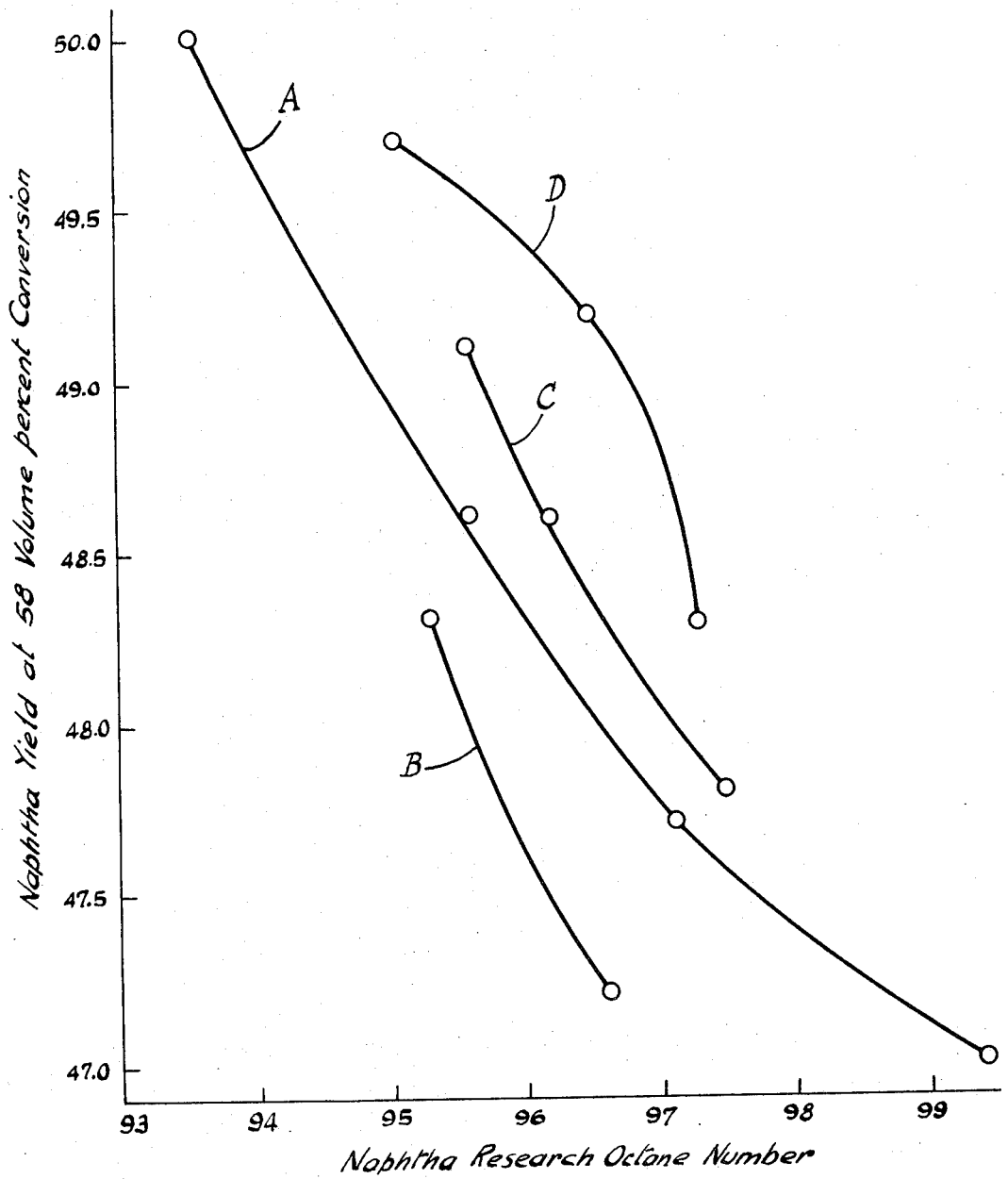

3,714,024
METHOD OF CATALYTIC CRACKING OF HYDROCARBONS
Douglas J. Youngblood, Groves, and David L. Reynolds, Nederland, Tex., assignors to Texaco Inc., New York, N.Y.
Filed Dec. 31, 1969, Ser. No. 889,380
Int. Cl. C10g 37/02
U.S. Cl. 208—78                11 Claims

ABSTRACT OF THE DISCLOSURE

In a fluid catalytic cracking unit employing a multiplicity of elongated reaction zones, significant improvements are obtained by introducing fresh feed to each of the elongated reaction zones and operating at least one at a higher temperature than at least one other while maintaining the conversion in the higher temperature zone equivalent to or lower than the conversion in the lower temperature reaction zone. Optionally, the vaporous effluent from either or both reaction zones may be subjected to further cracking in the dense phase of catalyst in the reaction vessel. Higher yields of higher octane gasoline are obtained where the unit is operated in the disclosed manner.

BACKGROUND OF THE INVENTION

This invention relates to an improved method for the fluid catalytic cracking of hydrocarbon oils. In particular, this invention relates to the fluid catalytic cracking of petroleum feed stocks. More particularly, it is related to a method of operating a fluid catalytic cracking unit (FCCU) having a multiplicity of elongated reaction zones, also described herein as risers, in order to obtain higher yields of naphtha at higher octane ratings than obtained heretofore.

In the fluid catalytic cracking process, hydrocarbons are converted under conditions such that substantial portions of a hydrocarbon feed are transformed into desirable products such as gasoline, liquified petroleum gas, alkylation feed stocks and middle distillate blending stocks with concomitant by-product formation of an undesirable nature, such as, gas and coke. When substantial amounts of coke deposition occur, reduction in catalyst activity and, particularly, catalyst selectivity results thereby detering hydrocarbon conversion, reducing gasoline production and simultaneously increasing the production of less desired products. To overcome such catalyst deactivation through coke deposition, the catalyst is normally withdrawn from the reaction zone and passed to a stripping zone wherein entrained and adsorbed hydrocarbons are initially displaced from the catalyst by means of a stripping medium such as steam. The steam and hydrocarbons are removed and the stripped catalyst is passed to a regeneration zone where it is contacted with an oxygen-containing gas to effect combustion of at least a portion of the coke and regeneration of the catalyst. Thereafter the regenerated catalyst is reintroduced to the reaction zone and therein contacted with additional hydrocarbons.

Recently there have been significant improvements in the catalytic cracking process. The introduction of zeolitic cracking catalysts has resulted in increased throughput and improved product quality from existing catalytic cracking units. In addition, improved catalytic cracking apparatus has been developed specifically for use with these improved catalysts which has further enhanced the overall process. For example, U.S. Pats. 3,433,733 and 3,448,037 are directed to the fluid catalytic cracking of petroleum hydrocarbons with zeolitic cracking catalysts and disclose operating parameters and techniques particularly directed to these new catalysts as well as fluid catalytic cracking apparatus designed to take advantage of the desirable characteristics of the zeolitic catalysts. More particularly the apparatus incorporates the concept of "riser cracking" wherein virgin feedstocks and cycle stocks are individually cracked in separate elongated reaction zones or risers terminating in a tapered reaction chamber containing a dense phase and a dilute phase of catalyst wherein further cracking takes place in the fluidized dense phase. With riser cracking it is possible to select operating conditions specifically suited to the particular feed, gas oil or recycle stocks, being introduced into each riser. In addition, the cracking apparatus incorporates a stripping section beneath the fluidized dense bed wherein entrained and adsorbed hydrocarbons are displaced from the catalyst by means of steam before the catalyst passes to the regenerator vessel. As with conventional fluid catalytic cracking equipment the catalyst is contacted with an oxygen-containing gas in the regenerator to effect combustion of at least a portion of the deposited coke. The regenerated catalyst is then reintroduced into the bottom of the elongated reaction zones or risers at a point where the feedstocks are introduced. Through the use of multiple risers it is possible to operate the individual risers under conditions providing maximum recovery of desired products with minimal formation of undesired materials at the maximum possible yields. Usually, the more refractory stocks, such as the cycle gas oils, will be passed through the riser operating at a higher temperature than the riser which is processing the fresh gas oil. The overall effect, of course, is to achieve optimum performance of both the fluid catalytic cracking unit and the zeolitic cracking catalyst.

Although the prior art patents have disclosed apparatus and operating procedures which take advantage of the unique properties of the zeolitic cracking catalyst, any other operating improvements which will further enhance the performance of the apparatus or the quality and/or quantity of the products are highly desirable.

SUMMARY OF THE INVENTION

Broadly, our invention is directed to an improved method of operating a fluid catalytic cracking unit wherein substantially all or most of the cracking takes place in a multiplicity of elongated reaction zones or risers. Higher naphtha yields at higher octane ratings are achieved by introducing the gas oil feed stock into the risers with at least one riser operated at a higher temperature than at least one other riser and with the conversion per pass in the higher temperature reactor being equal to or less than the per pass conversion in the lower temperature riser. In a preferred configuration a FCCU with two risers is employed.

BRIEF DESCRIPTION OF THE DRAWING

The present invention will be more readily understood by reference to the accompanying drawings.

FIG. 2 is a graph of naphtha yield versus naphtha research octane number obtained when operating a fluid catalytic cracking unit in a variety of modes, two of which incorporate features of this invention.

DESCRIPTION OF THE PREFERRED EMBODIMENT

Figure 1:
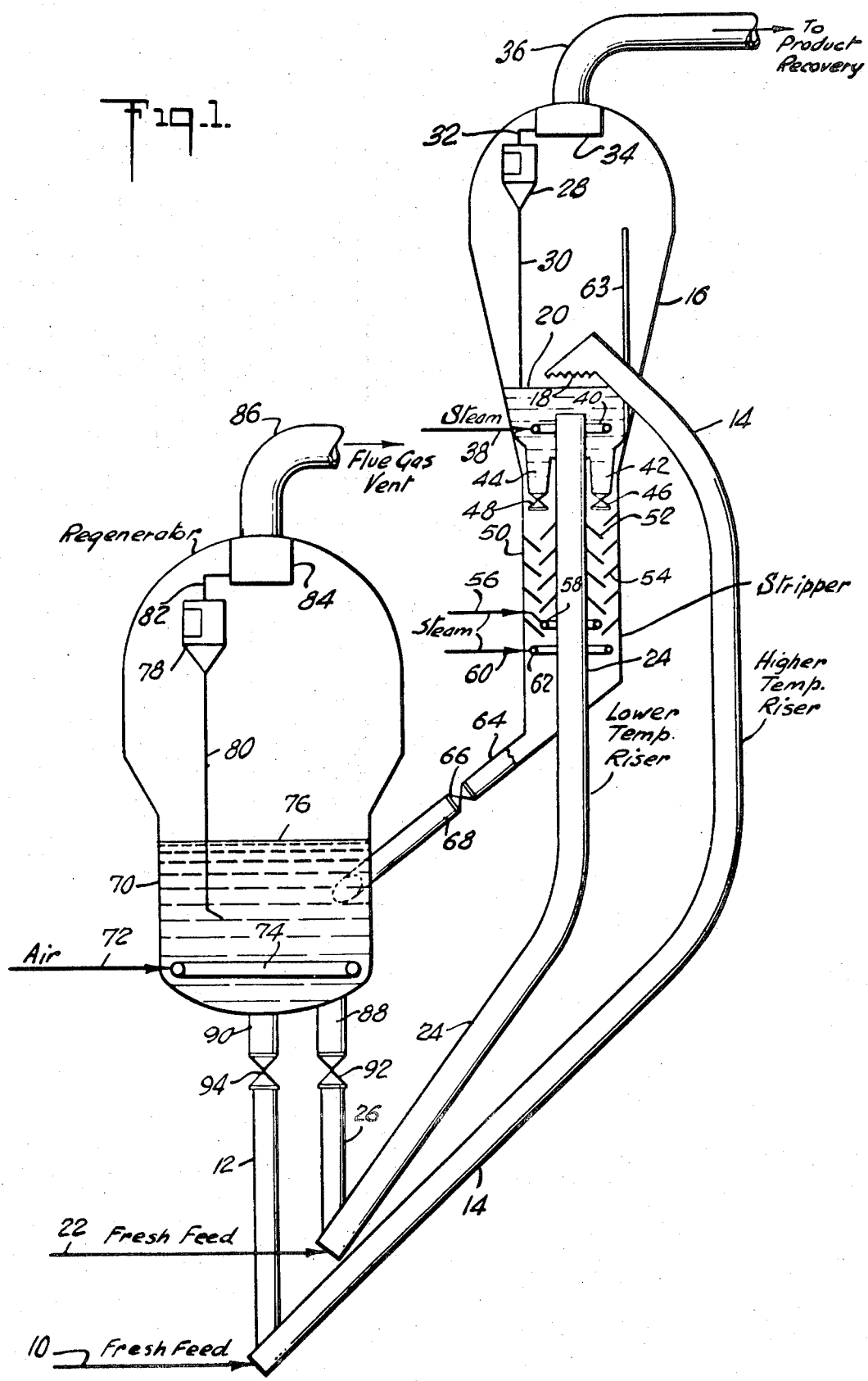
FIG. 1 illustrates and exemplifies an apparatus by which the process of the present invention may be practiced.

Broadly, we have found that significant improvements in the operation of a fluid catalytic cracking unit employing a zeolite cracking catalyst and having a multiplicity of risers can be obtained by subjecting the gas oil to catalytic cracking conditions in the risers while maintaining different temperatures in the risers and a conversion of the gas oil in the higher temperature risers equivalent to or lower than the conversion in the lower temperature risers. By operating in this fashion it is possible to obtain higher yields of higher octane gasoline than obtained heretofore in similar equipment.

Our invention contemplates, in a process for the catalytic cracking of a multiplicity of virgin gas oils with a zeolite cracking catalyst in a fluid catalytic cracking unit comprising a reactor, a regenerator and a multiplicity of elongated reaction zones wherein said reactor contains a dense phase and a dilute phase of said catalyst and said elongated reaction zones terminate at said reactor and wherein admixtures of said gas oil and said catalyst are passed through said elongated reaction zones under catalytic cracking conditions to said reactor, the improvement which comprises:

(a) Maintaining in at least one elongated reaction zone a temperature 20 to 200° F. higher than in at least one other elongated reaction zone, (b) Discharging the effluent from said elongated reaction zones into a catalyst phase in said reactor, said effluent comprising vaporous reaction mixture and catalyst.

Further, in the simplest embodiment of this invention wherein a fluid catalytic cracking unit having two risers is employed, the riser operating at the higher temperature is limited to 1150° F. while the catalytic cracking conditions in the second riser include a temperature of 800–1130° F. and a conversion of 30 to 80 volume percent.

Both riser cracking and fluidized dense phase cracking of the gas oil may be employed in this process, leading to a variety of optional embodiments. Although the possibilities may be obvious to those skilled in the art a number of variations will be described briefly in a process employing a two riser unit.

In one embodiment the cracking of the gas oil is restricted to the risers by discharging the effluent from both risers into the dilute phase of catalyst in the reactor vessel and wherein the per pass conversion in the higher temperature riser is 0 to 35 volume percent lower than in the lower temperature riser. In this situation the reactor vessel is utilized as a disengaging zone with little or no cracking taking place therein.

In another embodiment, the gas oil passing through the lower temperature riser is subjected to further cracking in the dense catalyst phase. This is achieved by discharging the effluent from the higher temperature riser into the dilute phase of catalyst and the effluent from the lower temperature riser into the dense phase of catalyst and by passing the vaporous reaction mixture from the lower temperature riser through the dense phase of catalyst under catalytic cracking conditions effecting an additional conversion of 5 to 30 volume percent. In this embodiment the per pass conversion in the higher temperature riser is 0 to 35 volume percent lower than the total convention achieved in the lower temperature riser and the dense phase of catalyst. The conversion in these last two zones does not exceed 80 volume percent. By adjusting the operating conditions, the conversion in the lower temperature riser may be lower, equal to or higher than that in the high temperature riser.

In a further embodiment the gas oil introduced into the lower temperature riser is only subjected to riser cracking while the gas oil in the higher temperature riser is cracked in both the riser and the dense phase of catalyst. The effluent from the lower temperature riser is discharged directly into the dilute phase of catalyst in the reactor vessel while the effluent from the higher temperature riser is discharged into the dense phase of catalyst and passed through this dense phase under catalytic cracking conditions effecting an additional conversion of 5 to 30 volume percent. The combined conversion in the high temperature riser and the dense phase does not exceed 80 volume percent while this combined conversion is 0 to 35 volume percent lower than in the lower temperature riser.

In another embodiment, the gas oil introduced into both risers is subjected to both riser cracking and dense phase bed cracking by discharging the effluent from both risers into the dense phase of catalyst and passing it therethrough under catalytic cracking conditions to effect an additional conversion of 5 to 30 volume percent. In this embodiment the per pass conversion in the higher temperature riser is 0 to 35 volume percent lower than in the lower temperature riser and the total conversion of all gas oils passing through these risers and the dense phase does not exceed 80 volume percent.

In accordance with this invention the fresh feed comprises gas oil type stocks. Among these feed stocks which may be usefully employed in the process of our invention are those petroleum fractions boiling from about 430 to about 1050° F. comprising heavy atmospheric gas oil, light and heavy vacuum gas oils, visbroken gas oil, deasphalted gas oil, decarbonized gas oil, hydrotreated gas oil and solvent extracted gas oil. All of these feed stocks are virgin stocks, i.e. petroleum stocks whose processing has not previously included fluid catalytic cracking.

The catalyst employed in the instant invention comprises a large pore crystalline aluminosilicate customarily referred to as a zeolite and an active metal oxide, as exemplified by silica-alumina gel or clay. The zeolites employed in the cracking catalysts herein possess ordered rigid three-dimensional structures having uniform pore diameters within the range of from about 5 to 15 A. The crystalline zeolitic catalysts employed herein comprise about 1 to 25 wt. percent zeolite, about 10 to 50 wt. percent alumina and the remainder silica. Among the preferred zeolites are those known as zeolite X and zeolite Y wherein at least a substantial portion of the original alkali metal ions have been replaced with such cations as hydrogen and/or metal or combination of metals such as barium, calcium, magnesium, manganese or rare earth metals, for example, cerium, lanthanum, neodymium, praseodymium, samarium and yttrium.

As contemplated herein the gas oil is introduced into each of several elongated reaction zones which are operated at different temperatures. In its simplest form two elongated reaction zones or risers are employed. The operating conditions include: 20–80 volume percent, preferably 40–60 volume percent, of the feed being introduced into the lower temperature riser which is operated at a temperature of 800–1130° F., preferably 840–1000° F., and a conversion per pass of 30–80 percent, preferably 40–75 percent. As used herein, percent conversion is defined as 100 minus the volume percent of product boiling above 430° F. The balance of the gas oil feed is introduced into the higher temperature riser which is operated at a temperature not exceeding 1150° F. and which is 20–200° F., preferably 50–150° F., higher than the lower temperature riser. The conversion per pass in the higher temperature riser is 0–35 percent, preferably 10–20 percent, lower than that in the lower temperature riser when the gas oil cracking is limited to riser cracking. When any of the embodiments incorporate cracking of the gas oil in the dense phase of catalyst, the relationship of the conversions in the several risers may be somewhat different as explained hereinbefore. Other operating conditions although not critical are those which are known in the art for riser cracking including a residence time of 2–15 seconds, preferably 3–10 seconds, a vapor velocity between 15 and 50 feet per second, preferably 20–40 ft./sec. and a space velocity of 10–100 w./hr./w., preferably 40–65 w./hr./w.

Where the effluent from either the higher or the lower temperature riser comprising vaporous reaction products and catalyst does not require further cracking it is discharged into the dilute phase above the dense phase fluidized bed. Where additional cracking of either effluent is required it is discharged into the lower portion of the fluidized dense phase of catalyst wherein further conversion of the vaporous products occurs. Catalyst discharged from a riser into the dilute phase portion of the reactor is disengaged from the gaseous reaction products above the dense phase bed and is combined with catalyst from a riser discharging into the dense phase. The combined catalyst as a fluidized dense bed is contacted with the vaporous effluent from this same riser for further conversion of the gas oil. The operating conditions within the dense phase include a temperature of 800–1150° F., a vapor velocity of 0.5 to 4 ft./sec., preferably 1.3–2.2 ft./sec. and a space velocity of 1–40 w./hr./w., preferably 3–25 w./hr./w. By permitting the vaporous products from a riser to contact the fluidized dense phase of catalyst a further conversion of 5–30 volume percent occurs.

Although the benefits of our invention are achieved by introducing fresh feed into each of several risers wherein between 20–80% of the feed is introduced into the lower temperature riser and the remainder into the higher temperature riser, we have found that in most instances optimum results are obtained with about a 50:50 split of fresh feed between the two risers. Those skilled in the art will appreciate, however, that particular feed stocks and/or product requirements may dictate a fresh feed split other than on a 1:1 basis to achieve optimum results.

By operating within the parameters of our invention, it is possible to obtain higher naphtha yields at higher octane than obtained by other operating schemes.

It may be possible to employ the process of our invention with existing multiple riser catalytic cracking units. Since any of a variety of embodiments are possible, the particular one selected may limit the application of our invention to a unit specifically designed for the intended use. Generally, increasing the reactor temperature produces a concomitant increase in per pass conversion which will result in having the higher temperature riser operate with the higher per pass conversion unless specific design or operating changes are employed. Rather than decrease the conversion in the higher temperature riser in existing equipment it may be possible to utilize this invention by increasing the conversion in the lower temperature riser by such means as decreasing the quantity of feed to the lower temperature riser. Although this might produce a very low and undesirable linear velocity, introducing steam into the lower temperature riser would alleviate this condition but residence time and conversion might be reduced excessively and catalyst activity might be adversely affected. Employing this invention in existing equipment may require careful study and adjustment of operating conditions and even some equipment modifications.

It is preferred that the catalytic cracking unit be specifically designed to operate under the process of our invention. To achieve a lower per pass conversion in the higher temperature riser, residence time in this riser must be reduced by such techniques as shortening the high temperature riser length, operating the high temperature riser at a higher linear velocity than the lower temperature riser, increasing the per pass cracking in the lower temperature riser by employing more dense phase cracking above the low temperature riser or any combination of these techniques.

The invention may be understood from the following detailed description of one of the embodiments, taken with reference to accompanying FIG. 1, which illustrates and exemplifies an apparatus by which the process of the present invention may be practiced. By describing our invention in terms of this apparatus it is not intended to restrict the invention thereby since modification to the illustrated apparatus may be made within the scope of the claims without departing from the spirit thereof.

Referring to FIG. 1, a fresh gas oil feed is introduced through lines 10 and 22 to each of two risers in approximately a 1:1 ratio. The feed stock in line 10 is brought into contact with hot regenerated equilibrium molecular sieve zeolite catalyst from standpipe 12; the catalyst being at a temperature of about 1150° F. The resulting suspension of catalyst-in-oil vapor, at a temperature of about 950° F., passes up riser 14 at a vapor velocity of about 40 ft./sec. and into the dilute catalyst phase of reactor 16. Riser 14, referred to as the higher temperature riser, terminates in a downwardly directed outlet having a serrated edge 18, the purpose of which is to provide smooth flow of hydrocarbon vapors from riser 14 into the dilute catalyst phase of reactor 16 particularly when the dense phase level 20 below serrated edge 18 fluctuates nearer the outlet of riser 14 as defined by serrated edge 18. Conditions prevailing in higher temperature riser 14 include a weight hourly space velocity of 60 w./hr./w. and a vapor velocity of 40 ft./sec. which provides a residence time of approximately 3.5 seconds. Conversion of the gas oil in this riser under these conditions amounts to approximately 50 volume percent.

The remainder of the feed passes through line 22 to lower temperature riser 24 where it is contacted with hot zeolite catalyst described above from standpipe 26. The resulting catalyst-vapor mixture at a temperature at about 870° F. passes upwardly through lower temperature riser 24 at an average velocity of about 20 ft./sec. with an average residence time of above 8 seconds. Other conditions in the lower temperature riser include a space velocity of 45 w./hr./w. During passage through lower temperature riser 24 a conversion of approximately 55 volume percent is obtained.

The effluent from lower temperature riser 24 discharges into the lower portion of reactor 16 and passes upwardly through the dense phase of cracking catalyst in reactor 16 effecting further conversion of about 11 percent of the gas oil. Other conditions in the dense phase of catalyst in reactor 16 include a catalyst to oil ratio of 12 and a weight hourly space velocity of 4 w./hr./w. The combined higher temperature riser cracking, lower temperature riser cracking and dense phase cracking provide an overall conversion of 58 volume percent wherein conversion is defined as 100 minus the volume percent of products boiling above 430° F. The vapor velocities in the reactor are 1.5 ft./sec. at the point where the lower temperature riser discharges into the dense phase, 1.2 ft./sec. at the point of vapor disengagement from the dense phase of catalyst at level 20, 2.5 ft./sec. at the point where the higher temperature riser discharges into the dilute phase and below 2 ft./sec. at the upper portion of the cyclone inlets.

Cracked products disengage from the catalyst in the dilute phase, i.e., above level 20 of the dense phase. The vapors together with any entrained catalyst pass through cyclone 28 wherein the catalyst is separated and returned to the bed through dip leg 30. Effluent gases pass from cyclone 28 through line 32 to plenum chamber 34 wherein the gases from additional cyclone assemblies, not shown, are collected and discharged from the reactor through line 36. Vapor line 36 conveys the cracked products to product recovery facilities, not shown, wherein the products are recovered and separated into desired products by compression, absorption and/or distillation facilities well known in the art.

Steam is passed through line 38 to steam ring 40 and discharges into the lower portion of reactor 16 at a point below the outlet of lower temperature riser 24. Dense phase catalyst in the lower portion of reactor 16 is stripped by the steam from ring 40 and passes downwardly through standpipes 42 and 44 and slide valves 46 and 48 into stripping zone 50. Stripping zone 50 is provided with baffles 52 attached to riser 24 and baffles 54 attached to the wall of stripper 50. Steam is discharged through line 56 and steam ring 58 into the lower portion of stripper zone 50 under baffles 52 and through line 60 and steam ring 62 under baffles 54. Steam rising through the stripper displaces and removes adsorbed and entrained hydrocarbon vapors which pass upwardly through stripper vent line 63 discharging into the dilute phase portion of reactor 16 where they are recovered together with the cracked products as described above.

TABLE I

|  | Case A | | | | Case B | | Case C | | Case D | |
| --- | --- | --- | --- | --- | --- | --- | --- | --- | --- | --- |
| Fresh feed (volume percent) to: | | | | | | | | | | |
| Riser 1 | 100 | 100 | 100 | 100 | 53.2 | 70 | 30 | 53.2 | 70 | 30 | 46.8 | 70 |
| Riser 2 | | | | | 46.8 | 30 | 70 | 46.8 | 30 | 70 | 53.2 | 30 |
| Riser temperature, ° F.: | | | | | | | | | | |
| Riser 1 | 840 | 890 | 920 | 960 | 840 | 840 | 840 | 840 | 840 | 840 | 840 | 840 |
| Riser 2 | | | | | 960 | 960 | 960 | 960 | 960 | 960 | 960 | 960 |
| 430° F. conversion, volume percent: | | | | | | | | | | |
| Riser 1 | 58 | 58 | 58 | 58 | 49.6 | 53.8 | 58 | 58 | 58 | 67.7 | 67.7 | 61.6 |
| Riser 2 | | | | | 67.7 | 67.7 | 58 | 58 | 58 | 53.8 | 49.6 | 49.6 |
| Overall | 58 | 58 | 58 | 58 | 58.0 | 58.0 | 58 | 58 | 58 | 58.0 | 58.0 | 58.0 |
| DP naphtha [1] yield, volume percent: | | | | | | | | | | |
| Riser 1 | 41.7 | 40.3 | 39.4 | 38.7 | 37.4 | 39.6 | 41.7 | 41.7 | 41.7 | 45.6 | 45.6 | 43.3 |
| Riser 2 | | | | | 40.6 | 40.6 | 38.6 | 38.6 | 38.6 | 37.5 | 36.6 | 36.6 |
| Overall | 41.7 | 40.3 | 39.4 | 38.7 | 38.9 | 40.0 | 40.3 | 40.3 | 40.8 | 40.0 | 40.9 | 41.4 |
| DB naphtha [2] yield, volume percent, overall | 50.0 | 48.6 | 47.7 | 47.0 | 47.2 | 48.3 | 47.8 | 48.6 | 49.1 | 48.3 | 49.2 | 49.7 |
| DP naphtha octane, (RON with 3 cc. TEL):[3] | | | | | | | | | | |
| Riser 1 | 91.0 | 93.7 | 95.6 | 98.4 | 91.1 | 90.9 | 91.0 | 91.0 | 91.0 | 91.5 | 91.5 | 91.1 |
| Riser 2 | | | | | 99.8 | 99.8 | 98.4 | 98.4 | 98.4 | 97.9 | 97.7 | 97.7 |
| Overall | 91.0 | 93.7 | 95.6 | 98.4 | 95.1 | 93.5 | 96.1 | 94.5 | 93.3 | 96.0 | 94.8 | 93.1 |
| DB naphtha octane, (RON with 3 cc. TEL); overall | 93.6 | 95.6 | 97.1 | 99.4 | 96.6 | 95.3 | 95.7 | 96.2 | 95.6 | 97.3 | 96.5 | 95.1 |

[1] Depentanized naphtha.
[2] Debutanized naphtha.
[3] Research octane number of naphtha containing 3 cc. of tetraethyl lead per gallon.

Stripped catalyst is withdrawn from the bottom of stripping zone 50 through spent catalyst standpipe 64 at a rate controlled by slide valve 66 and discharges through standpipe 68 into regenerator 70. The spent catalyst is contacted in regenerator 70 with air introduced through line 72 and air ring 74. The catalyst undergoing regeneration forms a dense phase in the regenerator having a top level 76. Carbon on the surface of the catalyst is burned and the resulting flue gas passes upwardly through regenerator 70 and enters cyclone 78 wherein entrained catalyst is separated and returned to the regenerator dense phase through dip leg 80. Effluent flue gas from cyclone 78 passes through line 82 into plenum chamber 84 and outwardly through flue gas line 86 to vent facilities, not shown, which may include means to recover heat and energy from the flue gases as is well known in the art. Regenerated catalyst is withdrawn from the bottom of regenerator 70 through lines 88 and 90 at rates controlled by slide valves 92 and 94 to supply the hot regenerated catalysts to standpipes 12 and 26 as described above.

The following exemplifies the practice of our invention in a series of operations of a continuous fluidized bed catalytic cracking unit. For simplicity no recycle and no dense phase cracking are employed in any of the several modes of operation.

In all cases a virgin gas oil having an API gravity of 30.9 and an ASTM distillation of: IBP 453° F.; 50%, 625° F.; and EP, above 760° F. In all instances an equilibrium molecular sieve zeolite catalyst is employed.

In Case A, the fresh gas oil is introduced into a single riser fluid catalytic cracking unit. In Case B, a fluid catalytic cracking unit (FCCU) employing the two riser concept is employed. Cracking is conducted in the two risers operating at different temperatures with the per pass conversion in the highter temperature riser being greater than that in the lower temperature riser. Cases A and B represent the prior art. In Case C and Case D a two-riser FCCU is employed with fresh feed being introduced to both risers, one of which is operated at a higher temperature than the other. In Case C the per pass conversion is the same in both risers whereas in Case D the per pass conversion is lower in the higher temperature riser. Both Case C and Case D are embodiments of the present invention. The naphtha yields and octane ratings of the products in these several cases are presented in Table I below. The overall 430° F. conversion in all instances is 58 vol. percent and the riser temperatures vary between 840 and 960° F. In addition, in all cases where fresh feed is introduced to both risers the effect of varying the ratio of fresh feed to the two risers is presented. FIG. 2, based on these data, presents a plot of naphtha yield versus naphtha octane at constant conversion for these several cases.

From a study of FIG. 2 and Table I it is seen that higher yields are obtained in Case C and Case D with those in Case D being the best. It is also seen that improved yields are not always obtained where fresh feed is charged to two reactor risers since Case B gave poorer results than obtained with Case A where the fresh feed was only charged to one riser. In addition it is seen that yield improvements are effected by the ratio in which the fresh feed is charged to each reactor riser. It appears that the fresh feed should be split in about 1:1 ratio to obtain the best results in Case D.

Obviously many modifications and variations of this invention, as hereinbefore set forth, may be made without departing from the spirit and scope thereof. Therefore only such limitations should be imposed as are indicated in the appended claims.

We claim
1. In a process for the catalytic cracking of a virgin gas oil with a zeolite cracking catalyst in a fluid catalytic cracking unit comprising a reactor, a regenerator and a multiplicity of elongated reaction zones wherein said reactor contains a dense phase and a dilute phase of said catalyst and said elongated reaction zones terminate at said reactor and wherein admixtures of said gas oil and said catalyst are passed through said elongated reaction zones under catalytic cracking conditions to said reactor, the improvement which comprises:
(a) passing a first portion of the virgin gas oil through a first elongated reaction zone,
(b) passing a second portion of the virgin gas oil through a second elongated reaction zone,
(c) maintaining in the first elongated reaction zone a temperature 20 to 200° F. higher and a per pass conversion 0–35 volume percent lower than in the second elongated reaction zone, and
(d) discharging the effluent from said elongated reaction zones into a catalyst phase in said reactor, said effluent comprising vaporous reaction mixture and catalyst.

2. A process according to claim 1 where the temperature in said first elongated reaction zone does not exceed 1150° F. and the catalytic cracking conditions in the second elongated reaction zone comprise a temperature of 800–1130° F. and a conversion of 30 to 80 volume percent.

3. A process according to claim 2 wherein the effluents from the first and second elongated reaction zones are discharged into a dilute phase of catalyst.

4. A process according to claim 2 wherein the effluent from the first elongated reaction zone is discharged into a dilute phase of catalyst, the effluent from the second elongated reaction zone is discharged into a dense phase of catalyst, and said vaporous reaction mixture from said second reaction zone passes through said dense phase under catalytic cracking conditions effecting an additional conversion of 5–30 volume percent, the per pass conversion in the first elongated reaction zone is 0–35 volume percent lower than the combined per pass conversion in the second elongated reaction zone and the dense phase of catalyst and the total conversion in said second elongated reaction zone and said dense phase does not exceed 80 volume percent.

5. A process according to claim 2 wherein the effluent from the second elongated reaction zone is discharged into a dilute phase of catalyst, the effluent from the first elongated reaction zone is discharged into a dense phase of catalyst and said vaporous reaction mixture from said first elongated reaction zone passes through said dense phase under catalytic cracking conditions effecting an additional conversion of 5 to 30 volume percent, the total per pass conversion in the first elongated reaction zone and the dense phase of catalyst is 0–35 volume percent lower than in the second elongated reaction zone and the total per pass conversion in said first elongated reaction zone and said dense phase does not exceed 80 volume percent.

6. A process according to claim 2 wherein the effluents from the first and the second elongated reaction zones are discharged to a dense phase of catalyst, said vaporous reaction mixtures from said first and said second elongated reaction zones pass through said dense phase under catalytic cracking conditions effecting an additional conversion of 5–30 volume percent, the per pass conversion in the first elongated reaction zone is 0–35 volume percent lower than in the second elongated reaction zone and the total per pass conversion of the gas oil passing through said elongated reaction zones and said dense phase does not exceed 80 volume percent.

7. A process according to claim 2 wherein 20 to 80 volume percent of a gas oil is introduced into the first elongated reaction zone and the remainder of said gas oil is introduced into the second elongated reaction zone.

8. A process according to claim 7 wherein the gas oil has a boiling range from about 430 to 1050° F.

9. A process according to claim 7 wherein 40 to 60 volume percent of the gas oil is introduced into the first elongated reaction zone, the temperature in the first elongated reaction zone is 50 to 150° F. higher and the conversion 10 to 20 percent lower than in the second elongated reaction zone, and the temperature in the second elongated reaction zone is 840 to 1000° F.

10. A process according to claim 7 wherein the gas oil is selected from the group consisting of heavy atmospheric gas oil, light vacuum gas oil, heavy vacuum gas oil, visbroken gas oil, deasphalted gas oil, decarbonized gas oil, hydrotreated gas oil and solvent extracted gas oil.

11. A process according to claim 1 wherein the zeolite cracking catalyst comprises crystalline aluminosilicate and silica-alumina.

References Cited

UNITED STATES PATENTS

| | | | |
|---|---|---|---|
| 2,710,279 | 6/1955 | Siecke | 208—155 |
| 2,903,414 | 9/1959 | Marisic et al. | 208—80 |
| 2,908,630 | 10/1959 | Friedman | 208—74 |
| 3,157,589 | 11/1964 | Scott et al. | 208—80 |
| 3,158,562 | 11/1964 | Peet | 208—80 |
| 3,448,037 | 6/1969 | Bunn et al. | 208—78 |
| 3,617,496 | 11/1971 | Bryson et al. | 208—80 |
| 3,617,497 | 11/1971 | Bryson et al. | 208—80 |

CURTIS R. DAVIS, Primary Examiner

U.S. Cl. X.R.

208—80